Oct. 25, 1960 R. C. KELNER ET AL 2,958,076

DATA SYNCHRONIZER

Filed Aug. 17, 1956 2 Sheets-Sheet 1

INVENTORS

ROBERT C. KELNER
HARRISON W. FULLER
HARVEY RUBINSTEIN
HAROLD E. LERNER

BY Joseph Weingarten

ATTORNEY

Oct. 25, 1960 R. C. KELNER ET AL 2,958,076

DATA SYNCHRONIZER

Filed Aug. 17, 1956 2 Sheets-Sheet 2

INVENTORS
ROBERT C. KELNER
HARRISON W. FULLER
HARVEY RUBINSTEIN
HAROLD E. LERNER

BY Joseph Weingarten
ATTORNEY

United States Patent Office 2,958,076

Patented Oct. 25, 1960

2,958,076

DATA SYNCHRONIZER

Robert C. Kelner, Concord, Harrison W. Fuller, Boston, Harvey Rubinstein, Lynnfield, and Harold E. Lerner, Chelsea, Mass., assignors, by mesne assignments, to Laboratory For Electronics, Inc., Boston, Mass., a corporation of Delaware Filed Aug. 17, 1956, Ser. No. 604,813

12 Claims. (Cl. 340—174)

The present invention relates in general to digital data processing apparatus, and more specifically to novel means for synchronizing randomly phased electrical impulses with respect to a predetermined timing signal. The apparatus of this invention is particularly well adapted to synchronize the electrical manifestation of binary digits in the signal derived from a magnetic storage medium by a self-clocked readout system, with the operations of a digital computer which utilizes the output from storage in conjunction with other available digital data in the performance of prescribed functions.

The co-pending application of Harrison W. Fuller and Robert C. Kelner, Serial No. 505,894, entitled Data Processing, filed May 4, 1955, discloses a novel self-clocked readout system offering reliable readout of binary data stored in a medium with a packing density greater than 1000 bits per inch. That application describes a synchronization technique in which a shift register is used for intermediate storage of read-out binary digits. This is a satisfactory arrangement when the time spacing between the read-out digit pulses does not differ appreciably from the interval between the computer timing pulses, however, in the event of wider phase fluctuations, it is possible that digits will not be furnished in proper synchronism for the computing operation. For example, when the storage medium is a rotating magnetic drum having such high packing density even slight variations in the recording surface velocity markedly affect the time spacing between information bits.

Accordingly, it is a primary object of the present invention to provide means for synchronizing data signals which may be asychronously read out of storage with the timing or clock signal which controls the operations of a computer which accepts and utilizes the read-out information.

Another object of the invention is to synchronize initially asynchronous binary data pulses with timing pulses to insure reliable computations in an associated computer.

A further object of the invention is to provide synchronization apparatus in accordance with the foregoing objects wherein magnetic cores are employed in all key circuits to enhance overall system reliability.

Still another object of the invention is to provide a synchronizer which includes a plurality of magnetic storage cores, each associated with respective stages of input and interrogation recirculating shift registers.

In one broad aspect, the invention comprises a plurality of storage means sequentially selected for storing input signal data, and means for recovering the stored data by sequentially sampling the storage means in the same order, but in synchronism with a timing signal.

More particularly, the invention comprises a plurality of binary storage elements each having an input and an output. An input terminal, adapted to be energized by binary data input pulses is sequentially coupled to each storage element input, thereby storing in the selected storage element the binary bit then appearing in the input signal. Upon storage of each binary bit, the input terminal is coupled to the next storage element; thus, successive input binary values are stored in consecutive storage elements. An output terminal is coupled to each storage element in the same sequence in which binary data is introduced to extract the data there stored; however, the output switching from storage element to storage element is in synchronism with a timing signal.

In a preferred form, the binary storage elements are bistable magnetic cores, each associated with an input stage and an interrogation stage of input and interrogation recirculating shift registers, respectively. In each recirculating shift register, one core resides in the first stable state, while all others are in the second stable state. Each input stage is energized by a shift pulse which is related to a binary digit then ready for insertion into a storage core. The shift pulse resets the core then in the first stable state to the second stable state, thereby charging an associated capacitor. Upon termination of the shift pulse, the capacitor discharges through an information winding on the core in the following stage to set the latter in the first stable state, and through an input winding on its associated storage core only when the digit to be stored is a first of the two possible binary digits. Arbitrarily assuming this first digit to be a One, discharge through the latter winding is prevented when a Zero is desired to then be stored. Thus, only the storage core associated with the input state then in the first stable state may have its stage changed to indicate the presence of a One digit at the input terminal.

In a similar manner, the first stable state is recirculated throughout the interrogation shift register; however, the capacitor of the stage then in the first stable state may always discharge through an interrogation winding on its associated storage core. Discharge through the latter winding resets the storage core on the second stable state when it has previously been set to the first stable state by discharge of an input capacitor through the input winding on said storage core. When the storage core is thus switched, an output winding thereon provides an output pulse in synchronism with the timing pulse which initiates application of a shift pulse to each stage in the interrogation shift register. The output winding of each storage core is connected through a buffer diode to a common output terminal to provide an output pulse for each One stored following the last generated timing pulse. Absence of an output pulse corresponds to recovery of a stored Zero.

Other features, objects and advantages of the invention will become apparent from the following specification when read with reference to the accompanying drawing in which.

Figure 1:
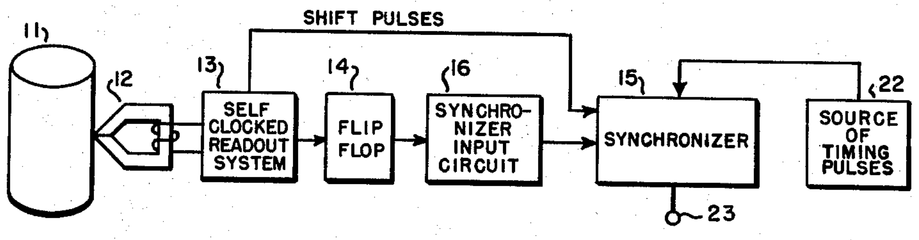
Fig. 1 is a block diagram of a system utilizing the novel synchronizer.

With reference now to the drawing, and more particularly Fig. 1 thereof, there is illustrated a block diagram of a system which utilizes the novel synchronizer circuit for synchronizing binary data signals derived from a densely packed magnetic storage medium with the timing signal of a computer which employs the data read from storage in its computational operations.

Magnetic drum 11 is scanned by readout head 12 to provide a signal characteristic of the stored binary data. This signal is in turn interpreted by a self-clocked readout system 13 (as in the above cited patent application) to provide data pulses for energizing flip-flop 14, and shift pulses to actuate means for selecting a storage element in the synchronizer 15. The synchronizer input circuit 16 senses the state of flip-flop 14 to energize synchronizer 15 with a signal characteristic of the binary data read out in synchronism with the generation of a shift pulse. A source of timing pulses 22 energizes synchronizer 15 with a timing signal to provide in synchronism with the latter an output signal on terminal 23 indicative of the binary bit sequence applied from input circuit 16.

Figures 2, 4:
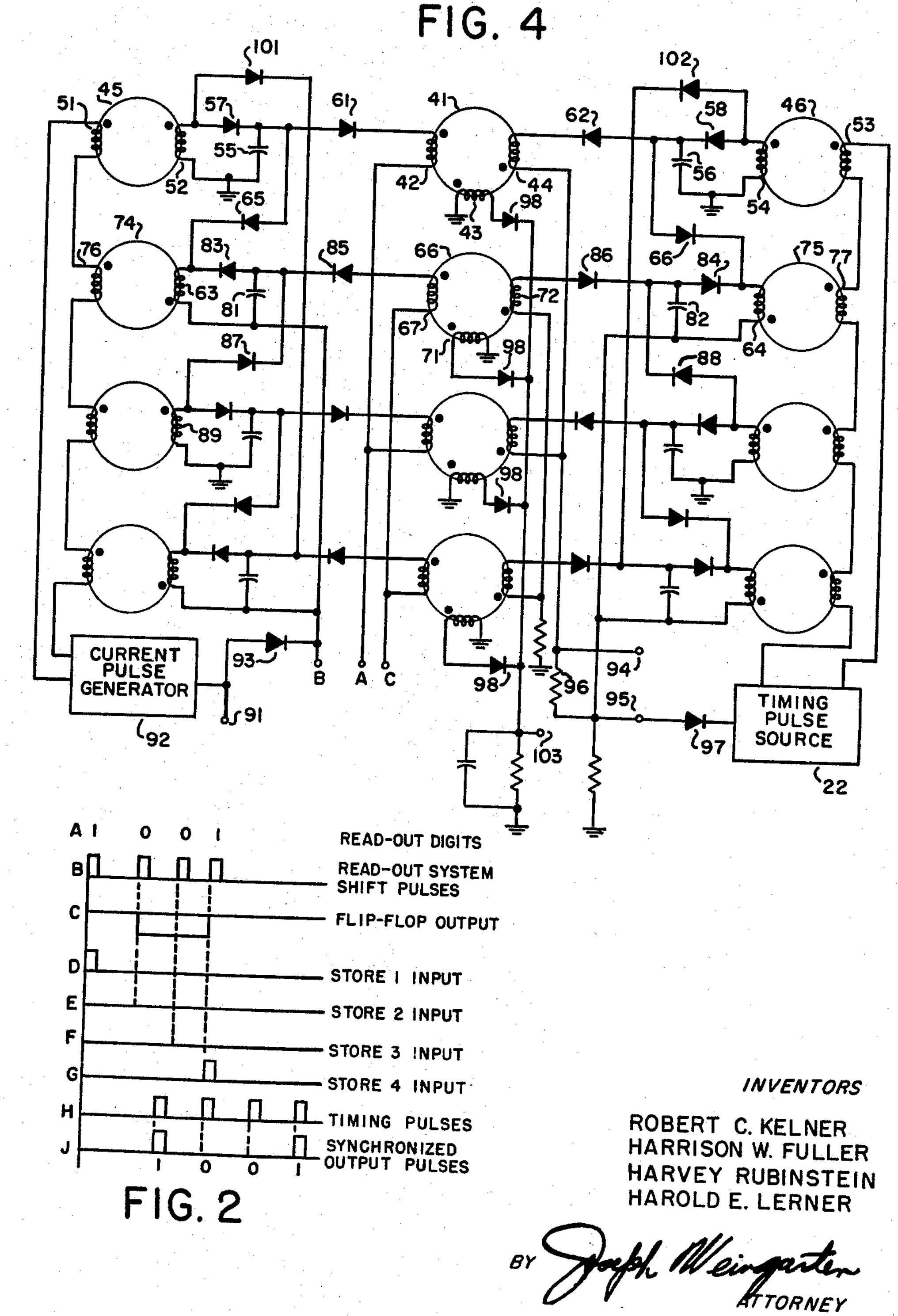
Fig. 2 is a graphical representation of signal waveforms helpful in understanding the operation of the apparatus.
Fig. 4 is a schematic circuit diagram of the synchonizer embodied in a preferred form utilizing magnetic cores.

The system will be better understood by referring to the pertinent signal waveforms of Fig. 2 graphically represented as a function of time. As indicated above, the synchronizer comprises a plurality of bistable elements sequentially coupled to input circuit 16 in response to shift pulses from system 13, the state of the then coupled element being set to be indicative of the contemporary binary bit at the output of input circuit 16. Later the binary bits are recovered from the elements by coupling the latter in the same sequence to output terminal 23 in synchronism with the timing signal from source 22.

For illustrative purposes, it is assumed that there are only four binary storage elements in the synchronizer; however, it is to be understood and will become apparent from the discussion which follows that any number of binary elements may be employed in the system. It is convenient to assume that self-clocked readout system 13, which could be of the type described in the aforesaid co-pending application of Fuller and Kelner, has read out the sequence of four digits designated in Fig. 2A. For each readout digit, there is generated a shift pulse, illustrated in Fig. 2B. Note that the time spacing between shift pulses in Fig. 2B is not uniform. These shift pulses may be derived, for example, on terminal 48 of the apparatus illustrated in Fig. 2 of the aforesaid co-pending application. Readout of the digit One from system 13 effects the setting of flip-flop 14 whereby the potential applied to circuit 16 is substantially zero when the binary digit One has last been read out; and a negative potential, when the digit Zero was last read out (Fig. 2C).

Timing pulses from source 22 are effective in sequentially coupling output terminal 23 to each of the storage elements. Coupling to a storage element is effected sometime after data has been read therein. In this example, the time interval between the insertion of data in and extraction from a storage element is substantially two bit periods, a bit period being the time interval between timing pulses. When a storage element has stored therein the binary digit One, and is coupled to output terminal 23, an output pulse is generated upon the latter terminal in response to the timing pulse. If the binary digit Zero is stored therein at that time, no output pulse is generated. Thus, interpretation of the signal waveforms in Figs. 2H and 2J indicate that the digit sequence of Fig. 1A has been read out at time intervals determined by the timing pulses from source 22.

In Fig. 2 each input pulse to and output pulse from a storage element is represented as occurring concurrently with read-out system pulses and timing pulses respectively in order to illustrate in simple form the basic object of the apparatus of converting irregularly spaced input binary bits into an output signal containing the input binary bits at regularly spaced intervals. In the specific embodiment described below which utilizes shift registers, the input and output pulses are actually delayed slightly from their respective shift and timing pulses.

Figure 3:
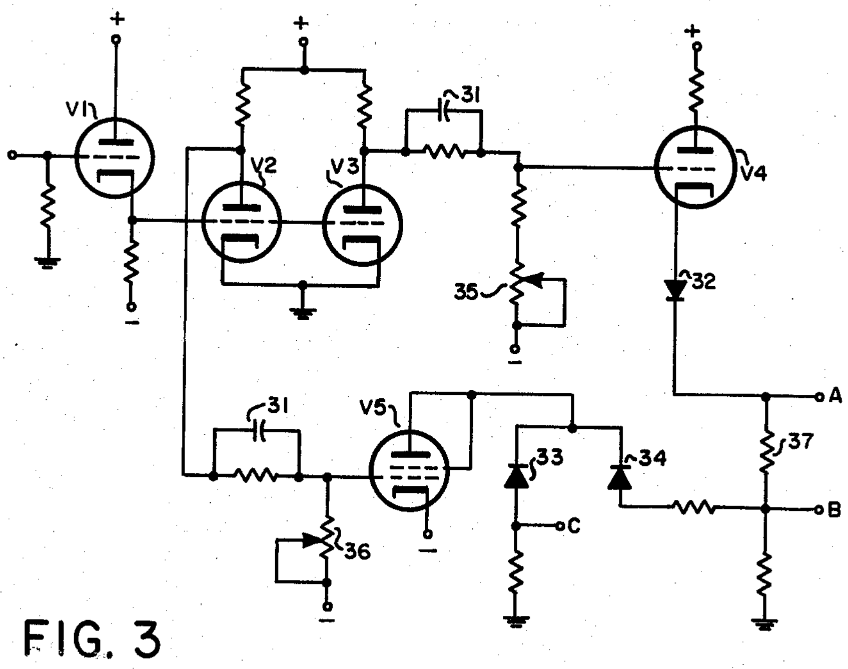
Fig. 3 is a schematic circuit diagram of the synchronizer input circuit of Fig. 1.

The foregoing discussion serves as an introduction to facilitate understanding the detailed description of the preferred embodiment of the invention which follows. With reference now to Fig. 3, there is illustrated a schematic circuit diagram of synchronizer input circuit 16 of Fig. 1. The input to the circuit is energized by flip-flop 14 (Fig. 1) to bear a potential thereon characteristic of the last digit read out by readout system 13. The latter input potential is reflected on output terminals A and C, the potential on terminal B always remaining substantially zero. The latter terminals are connected to appropriate circuit points of synchronizer 15, which is described in detail below.

The input circuit is seen to comprise an input cathode follower V1, which energizes a positive channel comprising tubes V3 and V4, and a negative channel comprising tubes V2 and V5. When the last binary digit read out is a One, the substantially zero potential is maintained on the grid of V1, and output terminals A, B and C. The last read-out digit being a Zero is signified by the grid potential of V1 dropping to a negative value, in the preferred embodiment, −20 volts. Corresponding to this negative potential, the potential on terminal A rises to +10 volts and that on terminal C to −10 volts, while terminal B remains at zero. The input amplifier is a conventional direct-coupled arrangement, with capacitors 31 enhancing the rise time of the circuit. Buffer diode 32 isolates the cathode of tube V4 from terminal A, except when a Zero has last been read out to render the latter tube conducting, at which time the potential on terminal A rises to +10 volts. In a similar manner, buffer diodes 33 and 34 isolate terminals C and B respectively from tube V5 except when the latter tube conducts in response to a Zero being the last read-out digit, to provide potential of −10 volts on terminals C and B, the potential on terminal B combining with the positive potential coupled from terminal A to maintain terminal B at zero potential irrespective of the potentials on terminals A or C. Potentiometers 35 and 36 are adjusted to maintain the desired balance and magnitude of potential on terminals A and C.

The utility of the foregoing potentials derived on terminals A and C in connection with operation of synchronizer 15 will become apparent from the following discussion of Fig. 4 which illustrates a schematic circuit diagram of a preferred embodiment of the synchronizer utilizing magnetic cores to reliably provide read-out data clocked in synchronism with an external timing signal. Only four stages are there illustrated so as not to obscure the principles of operation; however, it is to be understood that any number of stages may be cascaded to provide any desired delay between the read-out and synchronized information, and thereby permit read-out pulses to be synchronized when there exists any degree of fluctuation of the time interval between pulses read out. The degree of fluctuation which must be tolerated in a particular application is largely dependent upon the magnitude of recording surface velocity variations, and the length of the block of stored bits to be synchronized.

Each stage is seen to comprise a data core 41 having an input winding 42, an output winding 43, and an interrogation winding 44, together with input and interrogation cores 45 and 46 respectively, each of the latter cores having shift and information windings thereon designated 51 and 52 respectively on the input core, and 53 and 54 respectively on the interrogation core. Capacitors 55 and 56 are coupled across information windings 52 and 54 respectively through diodes 57 and 58 respectively. Capacitors 55 and 56 are respectively coupled to input and interrogation windings 42 and 44 by diodes 61 and 62 respectively, and to the information windings 63 and 64 respectively of the following stage by diodes 65 and 66 respectively. The elements in stage 2 are substantially the same as in stage 1, there being a storage core 66 having input, output, and interrogation windings respectively 67, 71 and 72, input and interrogation cores respectively 74 and 75, each having shift windings respectively 76 and 77 and information windings 63 and 64 respectively. However, shift and information windings on the latter two cores are arranged whereby the response from the latter information windings to their associated cores being switched by a shift pulse is a pulse oppositely phased from that derived across the corresponding windings in core stage 1. Accordingly capacitors 81 and 82 are coupled across windings 63 and 64 respectively by diodes 83 and 84 respectively, the latter diodes being poled oppositely to the corresponding diodes 57 and 58 in stage 1. In a similar manner, diodes 85 and 86, which couple capacitors 81 and 82 respectively to input and interrogation windings 67 and 72 respectively and diodes 87 and 88 which respectively couple the latter capacitors to information windings in stage 3 are oppositely poled with respect to their counterparts coupling stage 1 to stage 2. The reasons for these reverse connections will become apparent from the discussion of the mode of operation which appears below. Terminals A, B and C in Fig. 3 correspond to the same terminals in Fig. 4.

The voltage shift pulses from readout system 13 are applied to current pulse generator 92, which energizes the shift windings of the input cores, and to terminals A and B through resistor 37 (Fig. 3) and diode 93 respectively. Terminals 94 and 95 are energized through resistor 96 and diode 97 respectively by voltage pulses from timing pulse source 22, the latter also energizing with current pulses the serially connected shift windings of each stage in the interrogation shift register. Diodes 101 and 102 couple the last stage capacitors of input and interrogation shift registers respectively to the first stage of the respective registers, thereby effecting the recirculation mentioned above. The output winding of each data storage core is coupled to terminal 103 by a buffer diode 98, the latter terminal providing the read-out binary data synchronized with the timing pulses from source 22.

Having thus described the physical arrangement of the synchronizing circuit, its mode of operation will now be described. As mentioned above, the input and interrogation shift registers are arranged whereby a first stable state is recirculated throughout the register from stage to stage while all other stages remain in the second stable state. The first stable state is selected so that the stage residing therein is switched to the second stable state when current shift pulses are generated in response to voltage shift pulses from readout system 13 and timing pulse source 22 and applied to the shift windings of the input and interrogation registers respectively. In describing the mode of operation, it is convenient to make the following assumptions; the core 45 of input stage 1 is in the first stable state, and terminals A and C are at substantially zero potential, signifying that the last digit read-out was a One and is to be inserted into storage in core 41.

The positive voltage shift pulse, derived from readout system 13 concurrently with the last read-out digit, is applied to terminal B through buffer diode 93 and from the latter terminal to terminal A through resistor 37. The positive shift pulse is also applied to current pulse generator 92 which responds with a current pulse for application to the input shift windings. Application of the latter to shift winding 51 effects the resetting of core 45 to the second stable state to provide a pulse across winding 52 which renders diode 57 conductive whereby capacitor 55 is charged. However, application of the positive pulse to terminal A prevents diode 61 from conducting. From terminal B the latter pulse is coupled through winding 63 to diode 65, thereby rendering the latter non-conductive; hence, during the shift pulse interval, the only event which may occur is the charging of capacitor 55 through diode 57. Upon termination of the shift pulse, capacitor 55 may then discharge through diode 61 and winding 42, and through diode 65 and winding 63 to respectively set cores 41 and 74 in the first stable state.

If it were instead desired to insert the binary digit Zero into core 41, then terminal A would be raised to a relatively high positive potential, as described above, thus precluding diode 61 from conducting and preventing capacitor 55 from discharging through winding 42 of data core 41. Thus, a data core residing in the first stable state signifies that the binary digit One resides therein, the second stable state corresponding to the digit Zero there stored.

With core 74 now residing in the first stable state, the current pulse from generator 92 in response to the voltage shift pulse from readout system 13, concurrently generated with the next digit read-out and ready for storage in a data core, is effective in resetting core 74 to the second stable state, thereby generating a negative pulse across winding 63 which charges capacitor 81 through the then conducting diode 83. The pulse applied at terminal B prevents energy flow to this terminal during the shift pulse interval by raising the potential sufficiently high to preclude diodes 85 and 87 from then conducting. Upon termination of the shift pulse, the cathodes of diodes 85 and 87 become negative, permitting the discharge of capacitor 81 through diode 85 and winding 67 to terminal C, when the latter is at zero potential, signifying a One is to be stored in core 66, and through diode 87 and information winding 89 to set the input core in the third stage into the first stable state. If the binary digit Zero is to be inserted into core 66, then point C is at a negative potential, thus precluding conduction by diode 85 and thereby maintaining core 66 in the second stable state. Operation of stages 3 and 4 is like that of stages 1 and 2 respectively and additional cascaded stage pairs function in the same manner as the combination of stages 1 and 2.

Having thus described the insertion of binary data from the self-clocked readout system 12 into the storage cores, it is now appropriate to describe the mode of operation for interrogating the storage cores to provide output information in synchronism with the timing pulses from source 22. Operation of the interrogation recirculating shift register is substantially the same as that of the input register described above; however, the shift pulses for energizing the shift windings are derived from timing pulse source 22. Voltage pulses are also derived from the latter for application to terminal 95 through diode 97, the pulse on the latter terminal being coupled to terminal 94 by resistor 96. Terminals 94 and 95 correspond respectively to terminals A and C of the input register.

As in the input register, a first stable state is recirculated throughout the interrogation register, all the remaining stages being in the second stable state. Unlike the input register though, it is desired that a capacitor, which has been charged as a result of its associated core being switched from the first stable state to the second stable state, always discharge through the interrogation winding of its associated storage core, the discharge being effective in assuring that the associated core resides in the second stable state thereafter. If a core thus interrogated has previously resided in the first stable state, signifying that a One is stored therein, then the core is switched to provide an output pulse across the output winding 43 which is coupled to output terminal 103 through an associated buffer diode 98. Conversely, if the core is residing in the second stable state at the time of interrogation, it is not switched and no output pulse is generated across winding 43; hence, no output pulse is provided on terminal 103.

Thus, sampling of the output signal on terminal 103 during time intervals related to the generation of a timing pulse from source 22 yields an indication of the binary digit stored in the core then interrogated in desired synchronism with the timing signal for utilization in the operations of a computer.

The apparatus described enables the densely packed digital data which may be read out by a self-clocked readout system with variable spacing between the read-out digit signals, to be synchronized for insertion into the clocked mathematical operations of a high-speed computer. Thus, the novel system herein disclosed links the advantages obtainable from high-density storage and high-speed computing. A 28 stage synchronizer constructed as described above has enabled relatively long blocks of data stored in an 1100 bit-per-inch magnetic drum storage system to be utilized by a computer performing operations clocked by a 250 kilocycle timing signal.

Numerous modifications of and departures from the specific embodiment described may be practiced by those skilled in the art without departing from the inventive concepts disclosed herein. Consequently, the invention is to be construed as limited only by the spirit and scope of the appended claims.

What is claimed is:

1. Electrical synchronization apparatus comprising a plurality of bistable magnetic storage cores, means for sequentially selecting each of said cores in response to successive binary digits transmitted in an input signal, means for setting the stable state of the selected storage core to store successive binary digits represented by an input signal, a source of a timing signal, means for interrogating in sequence the storage cores containing the stored digits by applying an interrogation pulse in response to said timing signal to only one core during any one time interval to provide in synchronism with said timing signal, an output signal from each interrogated core characteristic of its stored digit.

2. Electrical synchronization apparatus comprising a plurality of bistable storage elements, input and interrogation gating means associated with each storage element, a source of input signals representing binary digits during successive time intervals, means for activating said input gating means in sequence in response to said input signals to set the stable state of the associated storage element to store the binary digit represented by the contemporary input signal, a source of a timing signal, and means for activating the interrogation gating means in response to said timing signal to interrogate the associated storage element and provide an output signal from each storage element characteristic of its stored digit.

3. Electrical synchronization apparatus comprising, a plurality of bistable magnetic storage cores, input and output gating means associated with each storage core, a source of input signals representing binary digits during successive time intervals, means for activating said input gating means in sequence in response to said input signals to set the stable state of the associated storage core to store the binary digit represented by the contemporary input signal, a source of a timing signal, and means for activating the output gating means in response to said timing signal to interrogate the associated storage core and provide an output signal from each storage core characteristic of its stored digit.

4. Synchronizing apparatus comprising, a plurality of data storage elements each having an input and output, an input terminal energized by binary signals related to first and second binary digits, switching means actuated by each of said binary signals for sequentially connecting said input terminal to each of said storage element inputs whereby an input sequence of digits characterized by the binary signals is sequentially stored in said binary elements, a source of timing pulses, an output terminal, output switching means actuated by said timing signal for sequentially connecting said output terminal to each of said binary storage element outputs to provide on said output terminal a signal characteristic of the stored binary digits of said input sequence.

5. Apparatus for synchronizing input data signals characteristic of first and second binary digits comprising, a plurality of bistable storage devices each having first and second stable states, input and output gating means associated with each of said storage devices, means for energizing each of said input gating means with a binary signal characteristic of the binary digit last represented by an input signal, means for sequentially actuating each of said input gating means in response to each input signal whereby the storage device associated with the actuated input gating means caused to reside in a stable state corresponding to the binary digit characterized by the contemporary binary signal, an output terminal, a source of timing pulses, means for energizing each of said output gating means with a timing pulse, and means for sequentially actuating said output gating means in response to said timing pulses to provide an interrogation pulse, whereby the storage device associated with the then actuated output gating means provides an indication at said output terminal of the binary digit then stored in the latter storage device in response to said interrogation pulse.

6. A synchronizer having input and output recirculating shift registers and comprising a plurality of magnetic storage cores having first and second stable states and having input, output and interrogation windings, an input stage of said input recirculating shift register associated with each storage core, each of said input stages comprising a magnetic core with shift and information windings thereon, a source of input pulses characteristic of first and second binary digits, a capacitor coupled across said information winding whereby it may be charged in response to a pulse thereacross but may not discharge therethrough, unilateral coupling means between said capacitor and the input winding of its associated storage core, gating means whereby said capacitor may discharge through the latter winding to set said storage core in the first stable state only when the most recent input pulse characterized said first binary digit to store the latter digit therein, unilateral coupling means between said capacitor and the information winding of the next input stage whereby said capacitor may discharge through the latter winding, means for applying a shift pulse to each shift winding in response to an input pulse, means for precluding the discharge of a capacitor during the interval the shift pulse is generated, an output stage of said output recirculating shift register associated with each storage core and arranged like said input stage with the shift winding of each stage energized by a pulse from a timing pulse source, whereby after discharge of the output stage capacitor through its associated storage core interrogation winding the latter resides in said second stable state to provide across the output winding of that storage core an output pulse only when said first binary digit has been stored therein.

7. A synchronizer comprising first, second and third like-numbered series of bistable magnetic cores, said second series being adapted to store binary digits, said first and third series respectively being connected in the form of a shift register such that a predetermined stable state is sequentially circulated throughout each register in response to applied shift pulses, means for applying shift pulses to said first core series coincidentally with randomly occurring data pulses representative of said binary digits, each core of said second series linking the correspondingly numbered core of said first series such that the admission of a binary digit to a second-series core depends upon the stable state of the corresponding first-series core, means for applying timed shift pulses to said third core series, each core of said second series linking the correspondingly numbered core of said third series such that the reading out of a binary digit from a second-series core depends upon the stable state of the corresponding third-series core.

8. A synchronizer comprising a series of bistable magnetic storage elements each adapted to store a binary digit, bistable magnetic gating means coupled to said storage elements for gating successive randomly occurring binary digits into said storage elements in a predetermined order, and interrogating means responsive to timing signals for reading said binary digits out of said elements in said predetermined order in timed relation with said timing sgnals.

9. A synchronizer comprising a plurality of bistable storage elements, a plurality of bistable input cores, means interconnecting said input cores in an ordered arrangement and responsive to the application of a shift pulse for causing a predetermined stable state to be sequentially advanced from one input core to the next ordered input core, means connecting each of said input cores to a corresponding storage element for causing the storage element connected to the input core having said predetermined stable state to be receptive to the storage of an input binary signal, a timing signal source, and means connected between said timing signal source and said storage elements for reading out the binary information stored in said storage elements in response to timing signals from said source.

10. A synchronizer comprising a plurality of bistable storage elements, a plurality of bistable input cores, means consecutively interconnecting said input cores to cause a predetermined stable state to be sequentially advanced from one input core to the next succeeding input core upon the application of a shift pulse, means connecting each of said input cores to a corresponding storage element for causing the storage element connected to the input core having said predetermined stable state to be placed in a stable state indicative of an impressed binary input signal, a timing signal source, and means for sequentially providing output signals from said storage elements in response to and in timed relationship with said timing signal.

11. A synchronizer comprising a plurality of bistable magnetic storage elements, a plurality of bistable input cores, means connecting said input cores in an ordered sequence, said means being adapted to cause each of said input cores to assume a predetermined stable state in sequence in response to shift pulses contemporaneous with successive randomly occurring data pulses representative of binary digits, means coupling each of said input cores to a corresponding storage element for causing said elements to sequentially store the digits represented by said data pulses, interrogating means connected to said storage elements for interrogating said elements in the same sequence used in storing the aforesaid digits, and a source of timing signals for actuating said interrogating means.

12. A synchronizer comprising a plurality of magnetic storage elements which may assume first and second stable states respectively characteristic of first and second binary digits, a plurality of bistable input cores, means interconnecting said input cores in an ordered arrangement and responsive to the application of a shift pulse for causing a predetermined stable state to be sequentially advanced from one input core to the next ordered input core, means connecting each of said input cores to a corresponding storage element for sequentially establishing the stable states of said storage elements to correspond to a sequence of binary input signals, a source of timing signals, interrogating means responsive to said timing signals for sequentially reading each storage element whereby each element in said second stable state is returned to said first stable state to provide an output pulse having a timed relationship to the actuating timing signal, and means for coupling each output pulse to an output terminal.

References Cited in the file of this patent

UNITED STATES PATENTS

| | | |
|---|---|---|
| 2,753,545 | Lund | July 3, 1956 |
| 2,769,163 | An Wang | Oct. 30, 1956 |
| 2,784,390 | Li Chien | Mar. 5, 1957 |
| 2,793,344 | Reynolds | May 21, 1957 |
| 2,825,890 | Ridler et al. | Mar. 4, 1958 |
| 2,850,234 | Bartelt et al. | Sept. 2, 1958 |

UNITED STATES PATENT OFFICE

CERTIFICATION OF CORRECTION

Patent No. 2,958,076 October 25, 1960

Robert C. Kelner et al.

It is hereby certified that error appears in the above numbered patent requiring correction and that the said Letters Patent should read as corrected below.

Column 2, line 28, for "state" read -- stage --; line 37, for "on" read -- to --; column 8, line 74, for "sgnals" read -- signals --.

Signed and sealed this 25th day of April 1961.

(SEAL)
Attest:

ERNEST W. SWIDER
Attesting Officer

DAVID L. LADD
Commissioner of Patents